United States Patent
Jung et al.

(10) Patent No.: US 11,615,327 B2
(45) Date of Patent: Mar. 28, 2023

(54) ARTIFICIAL INTELLIGENCE DEVICE FOR PROVIDING SEARCH SERVICE AND METHOD THEREOF

(71) Applicant: LG ELECTRONICS INC., Seoul (KR)

(72) Inventors: Boosoon Jung, Seoul (KR); Soora Bang, Seoul (KR); Woocheol Chung, Seoul (KR); Bomi Jang, Seoul (KR); Mingyoung Kam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 533 days.

(21) Appl. No.: 16/801,056

(22) Filed: Feb. 25, 2020

(65) Prior Publication Data

US 2021/0174226 A1 Jun. 10, 2021

(30) Foreign Application Priority Data

Dec. 5, 2019 (KR) .................. 10-2019-0160526

(51) Int. Cl.
*G06F 16/2457* (2019.01)
*G06N 5/04* (2023.01)
*G06N 20/00* (2019.01)

(52) U.S. Cl.
CPC .......... *G06N 5/04* (2013.01); *G06F 16/2457* (2019.01); *G06N 20/00* (2019.01)

(58) Field of Classification Search
CPC .............................. G06F 16/2457; G06N 5/04
See application file for complete search history.

(56) References Cited

U.S. PATENT DOCUMENTS

2013/0297608 A1* 11/2013 Etoh .................. H04N 21/4532
                                                          707/752
2018/0232460 A1* 8/2018 Goryachev .......... G06F 16/9535

* cited by examiner

*Primary Examiner* — Kris E Mackes
(74) *Attorney, Agent, or Firm* — Lee Hong Degerman Kang & Waimey

(57) ABSTRACT

Disclosed herein are an artificial intelligence device including a memory configured to store user interest data, a processor configured to generate a keyword combination including at least one of a time keyword, a place keyword, an object keyword or an application type keyword based on the user interest data, and a display configured to display at least one of a time keyword, a place keyword, an object keyword or an application type keyword included in the keyword combination.

18 Claims, 19 Drawing Sheets

ARTIFICIAL INTELLIGENCE DEVICE FOR PROVIDING SEARCH SERVICE AND METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0160526, filed on Dec. 5, 2019, the contents of which are all hereby incorporated by reference herein in their entirety.

BACKGROUND

The present disclosure relates to an artificial intelligence device for providing a search service and a method thereof.

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence device.

Meanwhile, recently, as use of an artificial intelligence device increases, the amount of data accumulated in an artificial intelligence device increases.

A user has difficulty in searching accumulated data as the amount of data accumulated in an artificial intelligence device increases.

Accordingly, there is an increasing need for a new function capable of easily searching a vast amount of user data.

SUMMARY

An object of the present disclosure is to solve the above-described problems and the other problems.

Another object of the present disclosure is to provide an artificial intelligence device and method for providing a search service.

Another object of the present disclosure is to provide an artificial intelligence device and method for generating keyword combinations of a vast amount of data.

Another object of the present disclosure is to provide an artificial intelligence device and method capable of searching for data of interest to a user on one screen.

Another object of the present disclosure is to provide an artificial intelligence device and method capable of proposing keyword combinations of data of interest to a user and enabling the user to select a keyword combination and to search for data.

According to an embodiment, provided is an artificial intelligence device including a memory configured to store user interest data, a processor configured to generate a keyword combination including at least one of a time keyword, a place keyword, an object keyword or an application type keyword based on the user interest data, and a display configured to display at least one of a time keyword, a place keyword, an object keyword, or an application type keyword included in the keyword combination.

According to another embodiment, provided is a method of providing a search service at an artificial intelligence device including storing user interest data, generating a keyword combination including at least one of a time keyword, a place keyword, an object keyword or an application type keyword based on the user interest data and displaying at least one of a time keyword, a place keyword, an object keyword or an application type keyword included in the keyword combination.

DETAILED DESCRIPTION OF THE EMBODIMENTS

Figure 1:
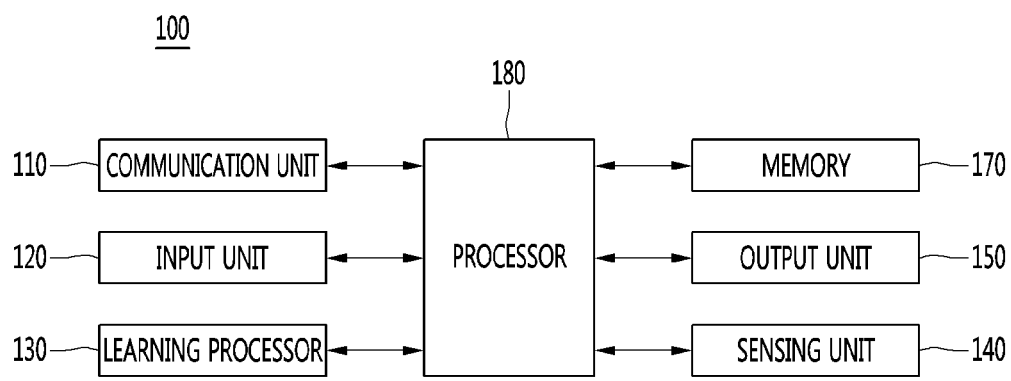
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a laptop, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting visual information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
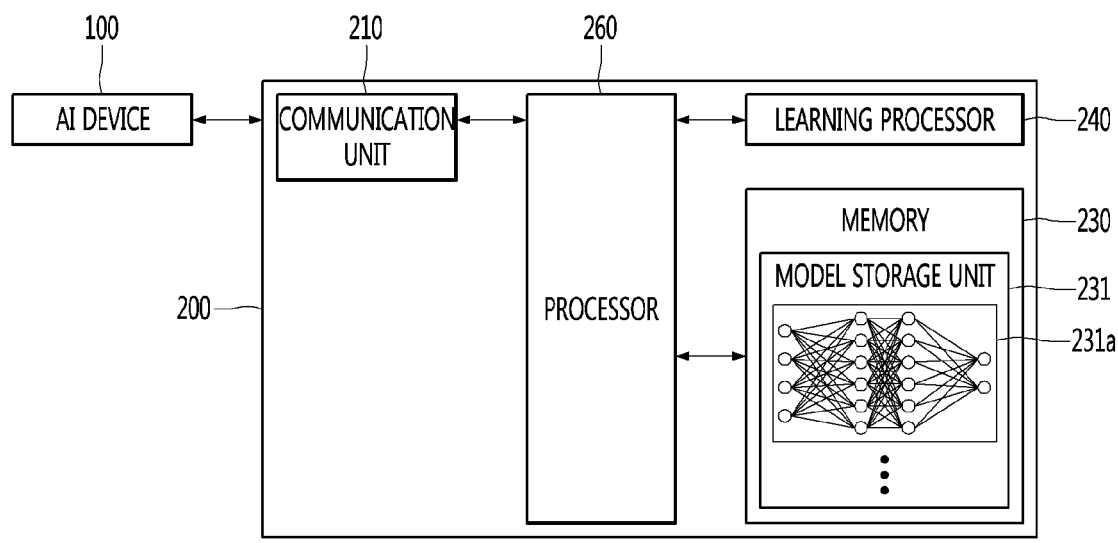
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
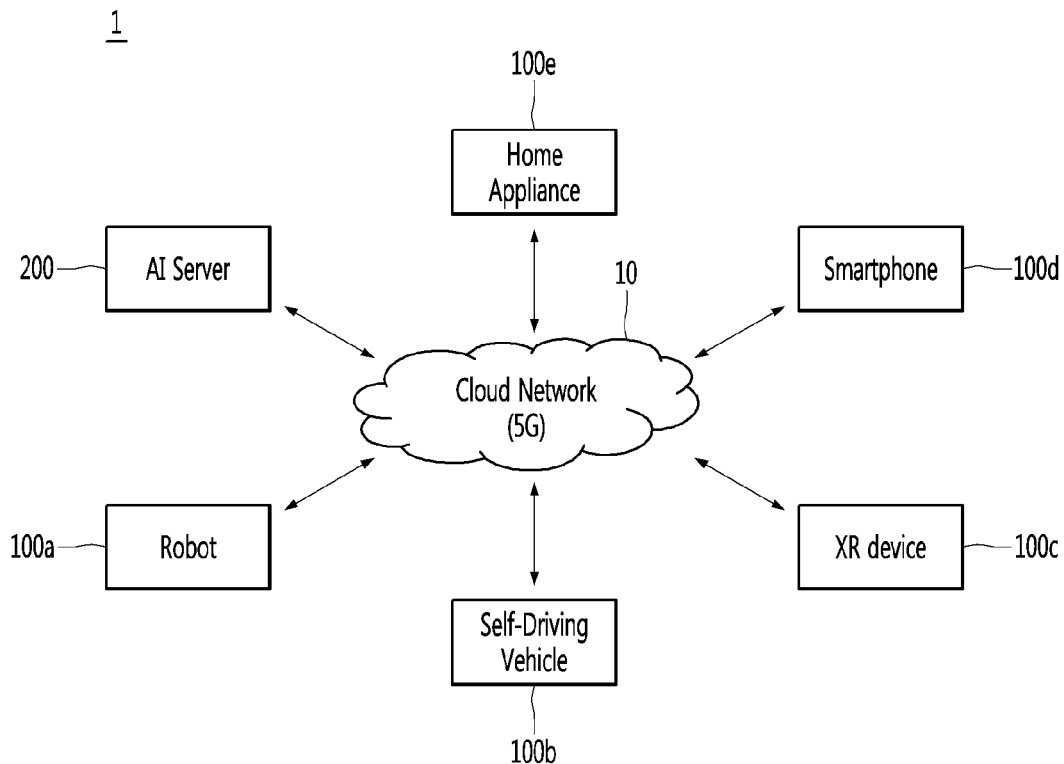
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a stationary robot, a mobile robot, or the like.

The XR device 100c may analyze three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence with the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user riding in the self-driving vehicle 100b, or may control the function of the self-driving vehicle 100b through the interaction with the user. For example, upon determining that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user may confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Meanwhile, the communication unit 110 of the artificial intelligence device 100 may include a location information module (not shown).

The location information module acquires the location (or the current location) of the artificial intelligence device and a representative example thereof includes a GPS (Global Positioning System) module or a Wi-Fi (Wireless Fidelity) module. For example, when the GPS module is used, the artificial intelligence device may acquire the location of the artificial intelligence device using a signal received from a GPS satellite.

Meanwhile, the input unit 120 of the artificial intelligence device 100 may include a user input unit (not shown). The user input unit may include a mechanical input unit (or a mechanical key, for example, a button located on a front/rear surface or a side surface of an electronic apparatus 300, a dome switch, a jog wheel, a jog switch, and the like) and a touch input unit. As one example, the touch input unit may be a virtual key, a soft key or a visual key, which is displayed on a touchscreen through software processing, or a touch key located at a portion other than the touchscreen.

Meanwhile, the output unit 150 of the artificial intelligence device 100 may include a display (not shown). The display displays (outputs) information processed in the artificial intelligence device 100. For example, the display may display execution screen information of an application program executing at the artificial intelligence device 100 or user interface (UI) and graphical user interface (GUI) information according to the execution screen information.

The display may have an inter-layered structure or an integrated structure with a touch sensor so as to implement a touchscreen. The touchscreen may provide an output interface between the artificial intelligence device 100 and a user, as well as functioning as the input unit 120 which provides an input interface between the artificial intelligence device 100 and the user.

Figure 4:
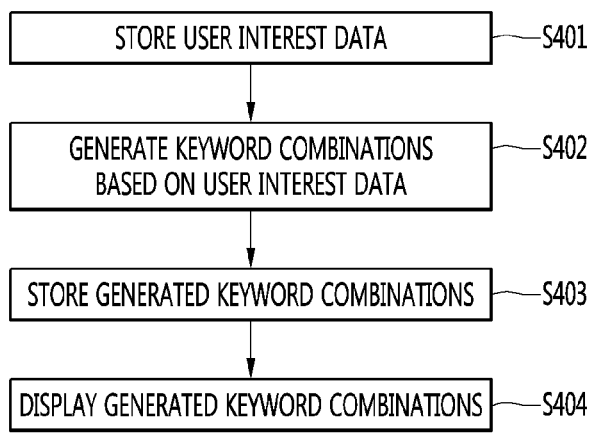
FIG. 4 is a flowchart illustrating a method of providing a search service according to an embodiment of the present disclosure.

FIG. 4 is a flowchart illustrating a method of providing a search service according to an embodiment of the present disclosure.

The memory 170 may store user interest data (S401).

The user interest data may refer to data generated or stored in an application such as phone, address book, text, image (photo or video), schedule management or memo. In addition, the user interest data may include the location information data of the artificial intelligence device 100.

The user interest data may mean data capable of being searched by a user.

For example, the user may search incoming/outgoing call history from the phone application of the artificial intelligence device 100. In addition, the user may search for a contact in the address book application of the artificial intelligence device 100. In addition, the user may search for a message in the text application of the artificial intelligence device 100. In addition, the user may search for a photo or video in the image application of the artificial intelligence device 100. In addition, the user may search a schedule in the schedule management application of the artificial intelligence device 100 or search a memo history in a memo application.

In addition, the user interest data may include data generated by the user using the artificial intelligence device 100 or data received via the communication unit 110 of the artificial intelligence device 100.

The user interest data may include text message data input by a user for transmission of a text message, image data of a photo or video taken or filmed via a camera, schedule data input for schedule management, memo data input for a memo, search data input for information search, and incoming/outgoing call data.

The processor 180 may generate keyword combinations including at least one of a time keyword, a place keyword, an object keyword or an application type keyword based on the user interest data (S402).

The time keyword may mean time information included in the user interest data. The time keyword may mean a keyword about "when".

For example, if the user interest data is text message data, information on a time when a text message is received or transmitted may become the time keyword. In addition, if the user interest data is schedule management data, information on a schedule time may become the time keyword. In addition, if the user interest data is photo or video data, a time when the photo or video included in metadata of photo or video data is taken or filmed become the time keyword. If the user interest data is memo data, a memo generation time may become the time keyword and, if the user interest data is incoming/outgoing call data, an incoming/outgoing call time become the time keyword.

In addition, the processor 180 may generate the time keyword based on a point in time when the user interest data is analyzed. For example, the processor 180 may generate the time keyword such as "today", "yesterday", "this week", "last week", "this month", "last month", "this year" or "last year" based on a data analysis time point and time information of the user interest data.

Meanwhile, the place keyword may mean place information included in the user interest data. The place keyword may mean a keyword about "where".

For example, if the user interest data is text message data, the location information of the artificial intelligence device 100 when the text message is transmitted/received may become the place keyword. In addition, if the user interest data is schedule management data, location information related to a schedule may become the place keyword. In addition, if the user interest data is photo or video data, information on a location where the photo or video included in the metadata of the photo or video data is taken or filmed may become the place keyword. In addition, if the user interest data is memo data, the location information of the artificial intelligence device 100 when the memo is generated may become the place keyword, and, if the user interest data is incoming/outgoing call data, the location information of the artificial intelligence device 100 when a phone call is received/transmitted is may become the place keyword.

Meanwhile, the processor 180 may acquire address information based on location information associated with the user interest data and generate the acquired address information as the place keyword.

For example, the information associated with the user interest data may be GPS location information including latitude and longitude information. The processor 180 may acquire address information using latitude and longitude information and generate the place keyword based on the acquired address information.

Meanwhile, the object keyword may mean object information included in the user interest data. The object keyword may mean a keyword about "what", that is, a keyword indicating what the user interest data is about.

The processor 180 may separate and extract a noun from text data included in the user interest data and generate the extracted noun as the object keyword.

For example, the processor 180 may separate and extract the noun from text message data, schedule management data or memo data including text data using a morpheme analysis module. In addition, the processor 180 may generate the object keyword based on tag information of image data. The processor 180 may separate and extract a noun from tag information of image data using a morpheme analysis module and generate an object keyword.

The morpheme analysis module may include an artificial neural network (ANN) model used in machine learning. The artificial neural network may be learned using a convolutional neural network (CNN) or a recurrent neural network (RNN) such as a long-short term memory (LSTM), without being limited thereto.

The morpheme analysis module may output a value tagged with a result of analyzing a morpheme for each syllable with respect to input text data.

The processor 180 may separate and extract a noun from text data based on a value tagged with a morphine analysis result for each syllable.

In addition, if the user interest data is schedule management data, location information related to a schedule may become the time keyword.

Meanwhile, the processor 180 may generate an object keyword based on an object recognized from image data included in the user interest data.

The processor 180 may acquire the object keyword based on an object recognized from image data using an object recognition model.

The object recognition model may be an artificial neural network model capable of outputting information on objects included in a photo or video when image data including photo or video data is input.

The object recognition model is composed of artificial neurons (nodes) that form a network by synaptic connections. The object recognition model can be defined by a connection pattern between neurons in different layers, a learning process for updating model parameters, and an activation function for generating an output value.

The object recognition model may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

The object recognition model may be generated via supervised learning, unsupervised learning or reinforcement learning according to the learning method.

Accordingly, the processor 180 may generate the object keyword based on tag information of image data or an object recognized from image data included in the user interest data.

Meanwhile, the application type keyword may be a keyword regarding the type of an application in which the user interest data is generated or stored.

For example, if the user interest data is text message data which is stored in a text application, the processor 180 may generate the application type keyword as "text".

In addition, if the user interest data is image data stored in an image (photo/video) application, the processor 180 may generate the application type keyword as an "image (photo/video)".

The application type keyword may be a keyword predetermined for each application. For example, the application type keyword may include a keyword such as "phone", "address book", "text", "photo", "video" or "memo" corresponding to an application.

The processor 180 may generate keyword combinations including at least one of the time keyword, the place keyword, the object keyword or the application type keyword based on the user interest data.

For example, the processor 180 may generate a time keyword "Jan. 1, 2019, 11:30 AM" or "morning of last week", generate a place keyword "399, Gangnam-daero, Seocho 4-dong Seocho-gu, Seoul", generate an object keyword "puppy", and generate an application type keyword "photo", with respect to image data. The processor 180 may generate keyword combinations obtained by combining the generated keywords, such as "morning of last week", "photo of last week", "Gangnam-daero in the morning of the last week", "puppy photo at Gangnam-daero in the morning of the last week". The keyword combinations may be generated by combining the time keyword, the place keyword, the object keyword and the application type keyword or by using only one keyword.

Figure 5:
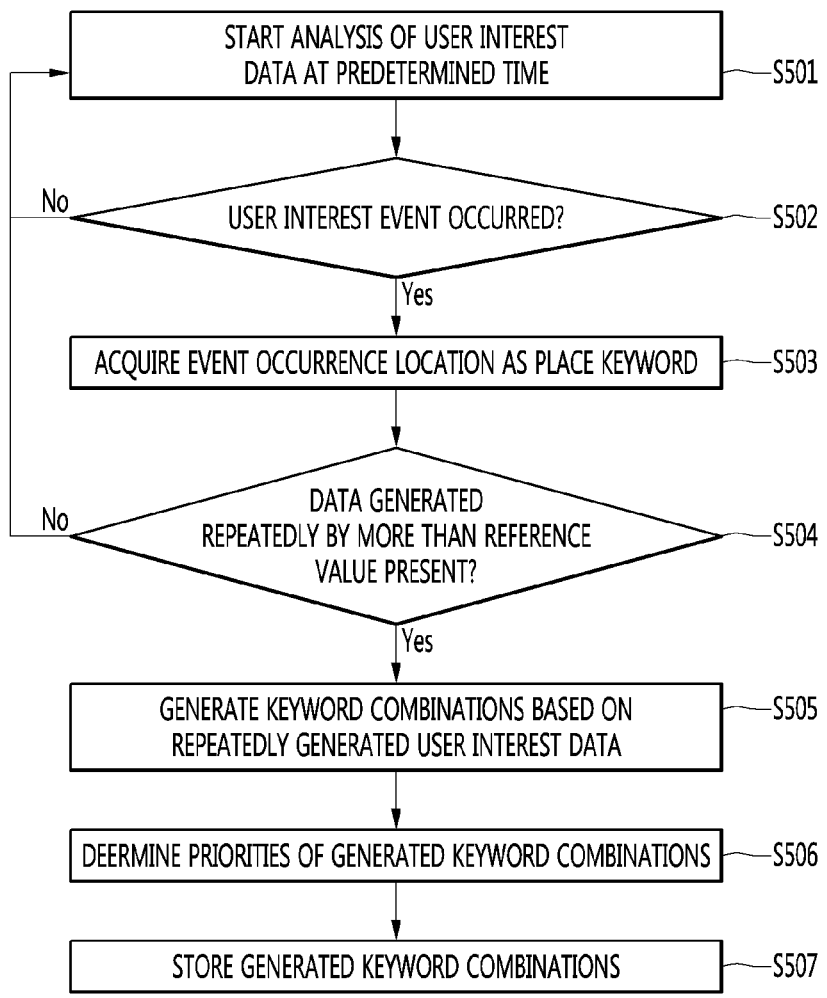
FIG. 5 is a flowchart illustrating a method of generating keyword combinations based on a place keyword according to an embodiment of the present disclosure.

FIG. 5 is a flowchart illustrating a method of generating keyword combinations based on a place keyword according to an embodiment of the present disclosure.

The processor 180 may start analysis of the user interest data at a predetermined time (S501).

The processor 180 may generate keyword combinations by starting analysis of the user interest data at a time set by the user or a time preset as a default time. For example, the processor 180 may start analysis of the user interest data during the nighttime from 2:00 AM to 5:00 AM when the resource usage of the artificial intelligence device 100 is low, thereby efficiently using the resource of the artificial intelligence device 100.

Meanwhile, the processor 180 may determine whether an event which may be of interest to the user has occurred based on the location information of the artificial intelligence device 100 (S502).

In addition, the processor 180 may acquire a location where the event which may be interest to the user has occurred as the place keyword (S503).

The processor 180 may acquire a personal region of interest (ROI) of the user based on the location information of the artificial intelligence device 100 and determine that the event which may be of interest to the user has occurred when the personal ROI is present.

The personal ROI of the user may include location information of a geographic region which may be determined to be of interest to the user.

The processor 180 may acquire the location information of the geographic region which may be determined to be of interest to the user based on the user interest data and the location information of the artificial intelligence device 100, and include the acquired location information in the personal ROI of the user.

For example, if schedule data registered in the schedule management application is "trip to Busan" and the location information of the artificial intelligence device 100 is "Busan", the processor 180 may include, as the personal POI of the user, "Busan" which is the location information of the geographic region which may be determined to be of interest to the user based on the location information of the artificial intelligence device 100 and schedule information. Accordingly, the processor 180 may determine that the event which may be of interest to the user has occurred in "Busan" which is the personal POI of the user. The processor 180 may acquire "Busan" as the place keyword, when the event which may be of interest to the user has occurred in "Busan".

In addition, the processor 180 may determine that the event which may be of interest to the user has occurred, when country information of the artificial intelligence device 100 is changed based on the location information of the artificial intelligence device 100.

For example, when the user travels from Korea to the United States, the location information of the artificial intelligence device 100 may be changed from Korea to the United States. The processor 180 may determine that an event which may be of interest to the user has occurred in the changed location "USA". In addition, the processor 180 may acquire the "USA" as the place keyword.

In addition, the processor 180 may determine whether user interest data repeatedly generated by more than a predetermined reference value is present (S504).

The processor 180 may determine whether an event which may be of interest to the user has occurred based on the location information of the artificial intelligence device 100 and whether the user interest data repeatedly generated by more than the predetermined reference value is present.

The user interest data repeatedly generated by more than the predetermined reference value may include user interest data generated as the user repeatedly uses text, phone, schedule, memo or photo application installed in the artificial intelligence device 100.

For example, the processor 180 may determine that the user interest data repeatedly generated by more than the predetermined reference value is present, when text or phone data having the same number is repeatedly generated three times or more at a predetermined location of the artificial intelligence device 100.

In addition, for example, the processor 180 may determine that the user interest data repeatedly generated by more than the predetermined reference value is present, when schedule data is repeatedly generated at the same place.

In addition, for example, the processor 180 may determine that the user interest data repeatedly generated by more than the predetermined reference value is present, when a memo application operates at a predetermined location to repeatedly generate a memo more than a predetermined number of times.

In addition, for example, the processor 180 may determine that the user interest data repeatedly generated by more than the predetermined reference value is present, when image data obtained by capturing an image more than a predetermined number of times at a predetermined location of the artificial intelligence device 100 is present.

Meanwhile, the processor 180 may acquire the location information of a user's home or office based on the change pattern of the location information of the artificial intelligence device 100. Alternatively, the processor 180 may acquire the location information of the user's home or office based on location information directly input by the user.

The processor 180 may determine whether user interest data generated when the artificial intelligence device 100 is located at user's home or office based on the location information of the artificial intelligence device 100 is present. For example, the processor 180 may determine whether data on a call made by the user at user's home or office is present.

The processor 180 may determine that the event which may be of interest to the user has occurred in user's home or office if the user interest data generated when the artificial intelligence device 100 is located at the user's home or office is present.

In addition, the processor 180 may determine that the event which may be of interest to the user has occurred in user's home or office, if the user interest data generated repeatedly by more than the predetermined reference value when the artificial intelligence device 100 is located at the user's home or office is present. In this case, the processor 180 may acquire "home" or "office" as the place keyword.

In addition, the processor 180 may determine that the event which may be of interest to the user has occurred in a region other than user's home or office, when the user interest data generated repeatedly by more than the predetermined reference value when the artificial intelligence device 100 is located in the region other than the user's home or office is present. In this case, the processor 180 may generate the place keyword based on address information acquired via the location information of the region other than the user's home or office.

Meanwhile, the processor 180 may generate keyword combinations by acquiring at least one of the time keyword, the object keyword or the application type keyword based on the user interest data repeatedly generated by more than the predetermined reference value at a location where the event has occurred (S505).

For example, the processor 180 may generate the keyword combinations based on the user interest data repeatedly generated by more than the predetermined reference value in "Busan", when the user interest event has occurred in "Busan".

For example, the processor 180 may generate the keyword combinations by acquiring the photographing time, the photographed object, the photo application type keyword with respect to data on five photos when there are five photo data photographed in "Busan". In this case, the keyword combinations may be based on the place keyword "Busan".

Accordingly, the processor 180 may generate the keyword combinations based on the place keyword, by using, as the place keyword, a location where the event which may be of interest to the user has occurred.

Meanwhile, the processor 180 may determine the priorities of the generated keyword combinations (S506).

The processor 180 may determine the priorities of the keyword combinations according to the frequency of generating the keyword combinations.

For example, the processor 180 may give a higher priority to a keyword combination "the text of this week" when the frequency of generating the keyword combination "the text of this week" is greater than the frequency of generating a keyword combination "the text of yesterday".

In addition, for example, the processor 180 may give a higher priority to a keyword combination "2019's puppy photo in the USA" when the frequency of generating the keyword combination "2019's puppy photo in the USA" is greater than the frequency of generating a keyword combination "2019's coffee photo in the USA".

In addition, the processor 180 may determine the priorities of the keyword combinations according to the chronological order of the time keywords included in the keyword combinations.

In addition, the processor 180 may give the set priority according to the application type keywords included in the keyword combinations.

Meanwhile, the processor 180 may store the generated keyword combinations in the memory 180 (S403).

The processor 180 may label the user interest data with the keyword combinations. Accordingly, the processor 180 may acquire the user interest data labeled with the keyword combinations matching a search word.

The processor 180 may store the keyword combinations generated based on the place keyword in the memory 170 (S507). Accordingly, the processor 180 may display the stored keyword combinations via the display and recommend the keyword combinations to the user.

Figure 6:
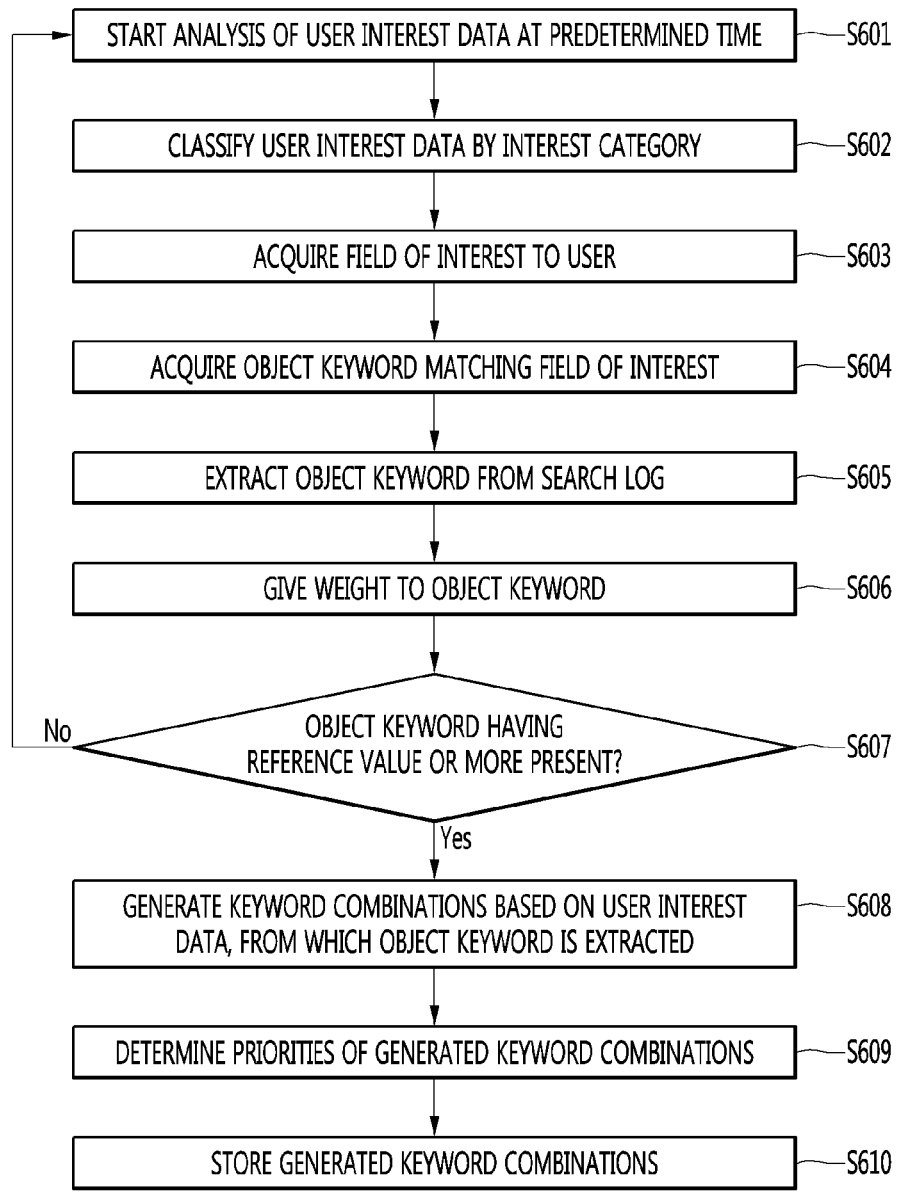
FIG. 6 is a flowchart illustrating a method of generating keyword combinations based on an object keyword according to an embodiment of the present disclosure.

FIG. 6 is a flowchart illustrating a method of generating keyword combinations based on an object keyword according to an embodiment of the present disclosure.

The processor 180 may start analysis of the user interest data at a predetermined time (S601).

The processor 180 may classify the user interest data by interest category (S602).

The interest category may have a major-classification category, a middle-classification category structure and a minor-classification category and each classification may have a high-level category and a low-level category.

The processor 180 may classify the user interest data by the interest category based on text information and image information included therein.

For example, the interest category includes "science and technology", "culture", "society", "economy", "food", "health", "travel", "sports", "animals and plants", "lifestyle", "beauty", "art", "education" and the like.

The processor 180 may label the user interest data with the classified interest category. Accordingly, the processor 180 may acquire a search request for the interest category and acquire the user interest data labeled with the interest category as a search result.

The processor 180 may acquire a field of interest to the user based on the classified interest category (S603).

The processor 180 may determine the field of interest to the user when the classified interest category is present.

For example, when the user interest data is classified as "travel" or "sports" and the classified interest category "travel" or "sports" is present, the processor 180 may acquire "travel" or "sports" as the field of interest to the user.

The processor 180 may acquire the object keyword matching the field of interest from the user interest data (S604).

The processor 180 may acquire an object keyword matching the field of interest, by acquiring the object keyword from the user interest data classified as a predetermined interest category.

For example, the processor 180 may acquire an object keyword such as "bag" or "coffee" from image data having the field of interest to the user "travel" as an interest category.

Accordingly, the processor 180 may generate the keyword combinations based on the object keyword related to the field of interest to the user.

In addition, the processor 180 may acquire the object keyword from a search log (S605).

The search log may be a list of search words input by the user via a search interface.

The processor 180 may extract a noun from the search log to acquire the object keyword.

The processor 180 may give a weight to the object keyword (S606).

The processor 180 may determine whether an object keyword having a predetermined reference value or more is present (S607).

Accordingly, the processor 180 may determine an important object keyword based on the weight of the object keyword.

The processor 180 may generate the keyword combinations by acquiring at least one of the time keyword, the place keyword or the application type keyword based on the user interest data, from which the object keyword is extracted, when the weight of the object keyword is equal to or greater than a predetermined reference value.

The processor 180 may generate the keyboard combinations using the user interest data, from which the object keyword related to the field of interest to the user is extracted. Accordingly, the processor 180 may generate keyword combinations that are likely to be of interest to the user.

Meanwhile, the processor 180 may determine the priorities of the generated keyword combinations (S609).

The processor 180 may determine the priorities of the keyword combinations according to the frequency of generating the keyword combinations.

In addition, the processor 180 may determine the priorities of the keyword combinations in the chronological order of the time keywords included in the keyword combinations.

In addition, the processor 180 may give the determined priority according to the application type keyword included in the keyword combinations.

Meanwhile, the processor 180 may store the generated keyword combinations in the memory (S403).

The processor 180 may label the user interest data with the keyword combinations. Accordingly, the processor 180 may acquire the user interest data labeled with the keyword combination matching the search word.

The processor 180 may store the keyword combinations generated based on the object keyword in the memory 170 (S410).

Meanwhile, the display of the output unit 150 may display at least one of the time keyword, the place keyword, the object keyword or the application type keyword included in the keyword combinations (S404).

Figure 7:
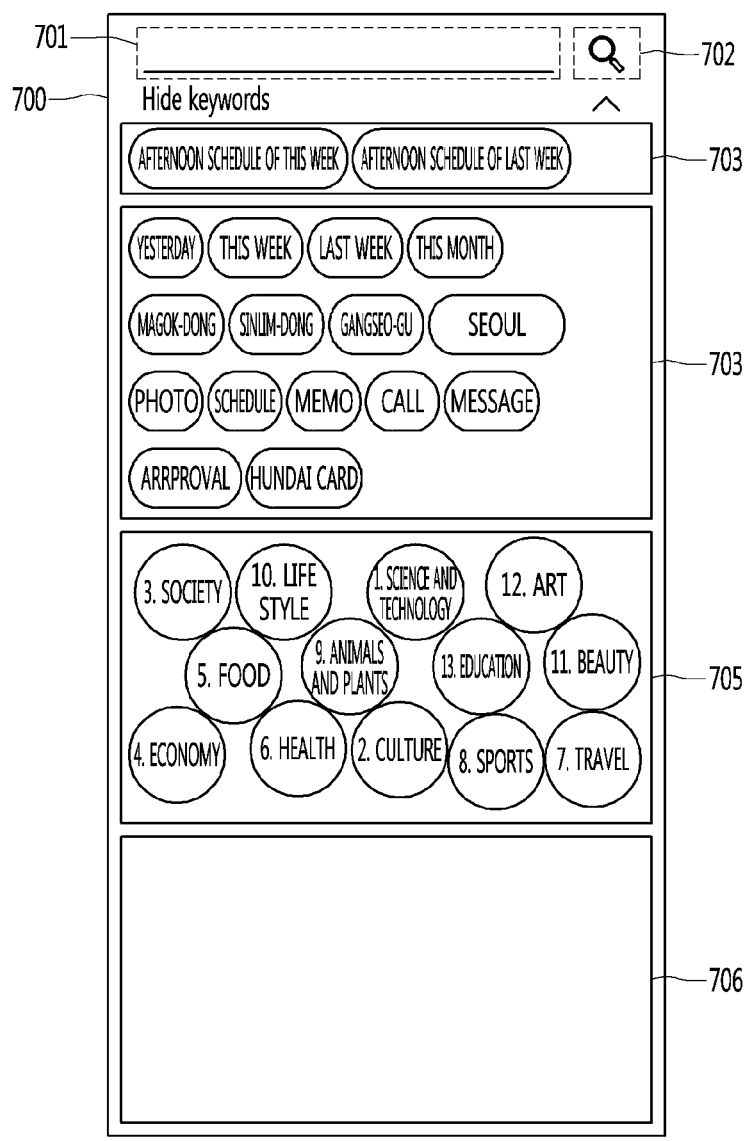
FIG. 7 is a view illustrating a search interface according to an embodiment of the present disclosure.

Referring to FIG. 7, the processor 180 may generate and display a user interface 700 for search via the display.

The search interface 700 may include a search word input interface 701 for inputting a search word, a search button interface 702 for inputting a search command, a keyword combination interface 703 for displaying completed keyword combinations, a hint keyword interface 704 for displaying keywords included in the keyword combinations and inducing detailed search of a user, an interest category interface 705 for displaying an interest category acquired from the user interest data, and a search result interface 706 for displaying a search result.

The processor 180 may display, via the display, a search interface including at least one of the time keyword, the place keyword, the object keyword or the application type keyword included in the keyword combinations.

The processor 180 may generate and display, via the display, the keyword combination interface 708 including the keyword combination completed by combining the keywords.

For example, the processor 180 may display, via the display, the keyword combination interface 703 including the keyword combinations "the schedule of the afternoon of this week" "the schedule of the afternoon of the last week" generated in order of priority.

In addition, the processor 180 may generate and display, via the display, the hint keyword interface 704 including the time keywords "yesterday", "this week", "last week" and "this month", the place keywords "Magok-dong", "Sinlim-dong", "Gangseo-gu" and "Seoul", the application type keywords "photo", "schedule", "memo", and "message", and the object keywords "approval" and "Hundai card".

The hint keyword interface 704 may display the time keyword, the place keyword, the object keyword and the application keyword included in the generated keyword combinations, thereby helping in reaching the desired search result of the user.

The processor 180 may acquire a hint keyword with respect to all the generated keyword combinations when there is no initially input search word.

The processor 180 may acquire a time hint keyword, a place hint keyword, an object hint keyword and an application type hint keyword for detailed search corresponding to the search word.

In addition, the processor 180 may generate and display, via the display, the interest category interface 705 including the interest categories "science and technology", "culture", "society", "economy", "food", "health", "travel", "sports", "animals and plants", "lifestyle", "beauty", "art", "education" and the like.

In addition, the processor 180 may generate and display, via the display, the search result interface 706 for displaying the search result.

Figure 8:
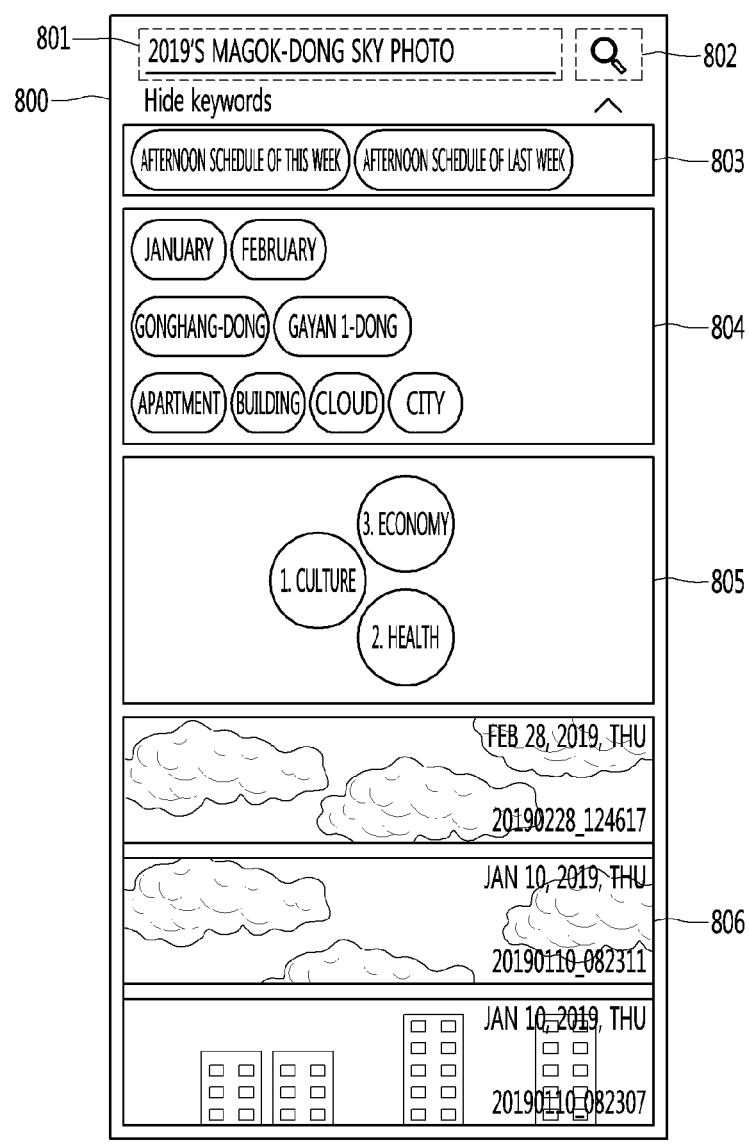
FIG. 8 is a view illustrating a search interface provided according to an input search word according to an embodiment of the present disclosure.
Figure 9:
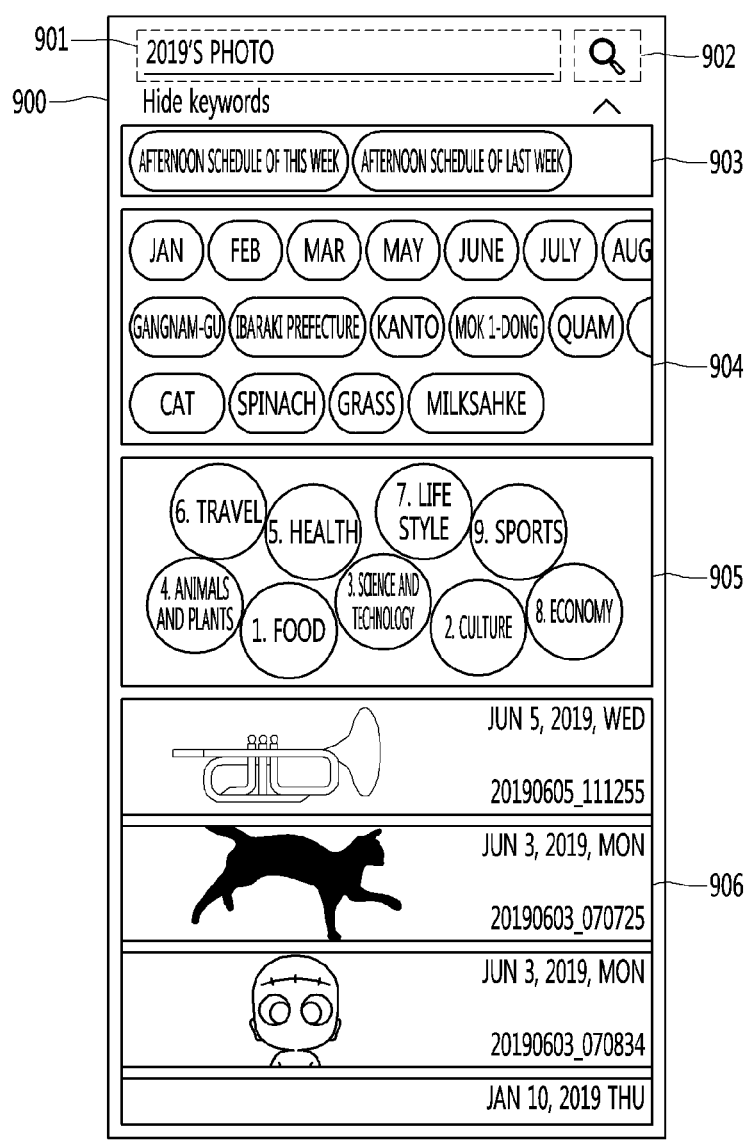
FIG. 9 is a view illustrating a search interface provided according to an input search word according to an embodiment of the present disclosure.

FIGS. 8 and 9 are views illustrating a search interface provided according to an input search word according to an embodiment of the present disclosure.

The processor 180 may acquire a search word for searching for the user interest data.

Referring to FIG. 8, the processor 180 may acquire a search word "2019's Magok-dong sky photo" input to the search word input interface 801.

In addition, referring to FIG. 9, the processor 180 may acquire the search word "2019's photo" input to the search word input interface 901.

The processor 180 may extract at least one of a time search word, a place search word, an object search word or an application type search word from the search word.

Referring to FIG. 8, the processor 180 may acquire a time search word "2019", a place search word "Magok-dong", an object search word "sky" and an application type search word "photo" from the search word "2019's Magok-dong sky photo".

Referring to FIG. 9, the processor 180 may acquire the time search word "2019" and he application type search word "photo" from the search word "2019's photo".

The processor 180 may acquire, as a search result, the user interest data labeled with a keyword combination common with at least one of the time search word, the place search word, the object search word or the application type search word.

The time keyword common with the time search word may include a time keyword included in a time range of the time search word.

The place keyword common with the place search word may include the same place keyword as the place search word and may include a place keyword within a predetermined radius from the place search word.

Referring to FIG. 8, the processor 180 may acquire image data labeled with a time keyword "2019" and an object keyword "sky" among image data stored in an application "photo", when a time search word "2019", a place search word "Magok-dong", an object search word "sky" and an application type search word "photo". In addition, the processor 180 may acquire, as the search result, image data labeled with the place keyword within the predetermined radius from the place search word "Magok-dong".

The processor 180 may display, via the display, the search result interface 804 including the acquired search result.

Referring to FIG. 9, when the time search word "2019" and the application type search word "photo" are acquired, image data having the time keyword "2019" of the image data stored in the application "photo" may be acquired.

The processor 180 may display, via the display, the search result interface 906 including the acquired search result.

The processor 180 may acquire a time hint keyword, a place hint keyword, an object hint keyword and an application type hint keyword for detailed search corresponding to the search word based on the keyword combinations labeled in the user interest data included in the search result.

The time hint keyword may refer to a keyword capable of searching for a time search word in more detailed time units.

The place hint keyword may refer to a keyword capable of searching for a place search word in more detailed place units and may include another place keyword within a predetermined radius of the place search word. Accordingly, the processor 180 may enable the user to perform detailed search in narrower place units or to search for the user interest data related to a neighboring region.

The object hint keyword may include the object keyword included in the user interest data included in the search result. For example, the processor 180 may enable the user to search for image data having other objects photographed with the object search word when the user searches for image data.

The application type hint keyword may include keywords for the application types of the user interest data included in the search result.

Referring to FIG. 8, the processor 180 may generate and display, via the display, the hint keyword interface 804 including the time hint keyword, the place hint keyword and the object hint keyword for detailed search corresponding to the search word.

The display may display at least one of the time hint keyword, the place hint keyword, the object hint keyword or the application type hint keyword.

The display may display at least one of the time hint keyword, the place hint keyword, the object hint keyword or the application type hint keyword.

For example, the processor 180 may acquire time hint keywords "January" and "February" capable of searching for the time search word "2019" in more detailed time units. In addition, the processor 180 may acquire other place keywords "Gonghang-dong" and "Gayang 1-dong" within a predetermined radius from the place search word "Magok-dong". In addition, the processor 180 may acquire the object keywords "apartment", "building", "cloud" and "city" included in the user interest data included in the search result.

Referring to FIG. 9, the processor 180 may generate and display, via the display, the hint keyword interface 904 included in the time hint keyword, the place hint keyword and the object hint keyword for detailed search corresponding to the search word.

For example, the processor 180 may acquire a monthly time keyword capable of searching for the time search word "2019" in more detailed time units.

In addition, the processor 180 may acquire place keywords "Gangnam-gu" and "Ibaraki Prefecture" extracted from the user interest data included in the search result.

In addition, the processor 180 may acquire the object keywords "cat", "spinach" and "grass" included in the user interest data included in the search result.

Figure 10A:
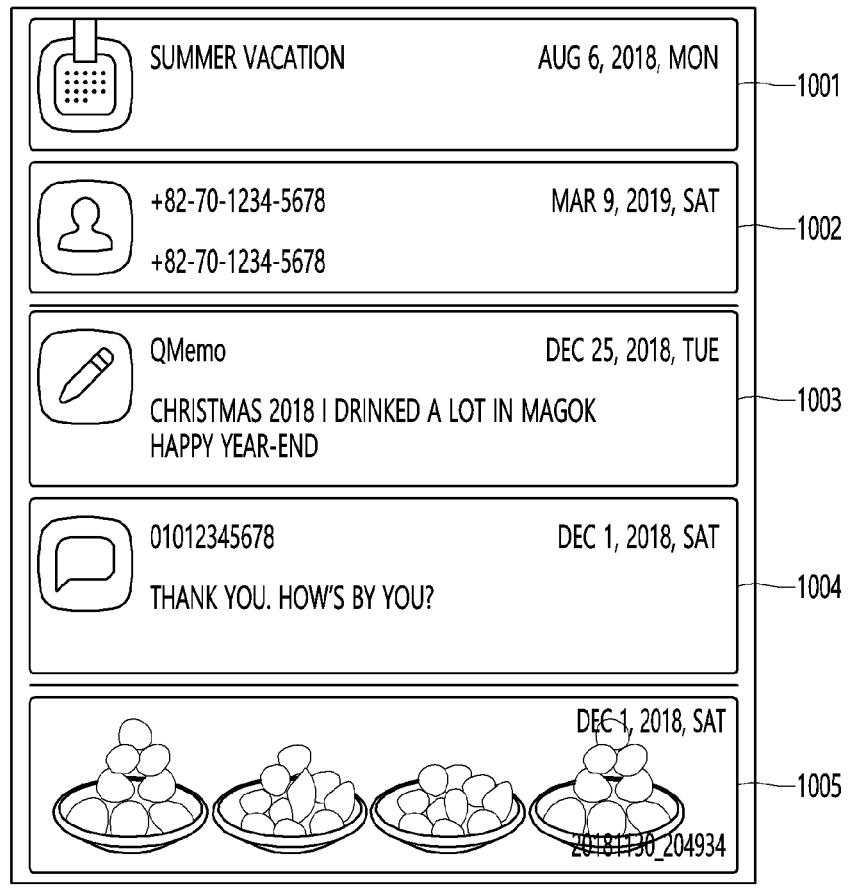
FIG. 10A is a view illustrating a search result interface according to an embodiment of the present disclosure.
Figure 10B:
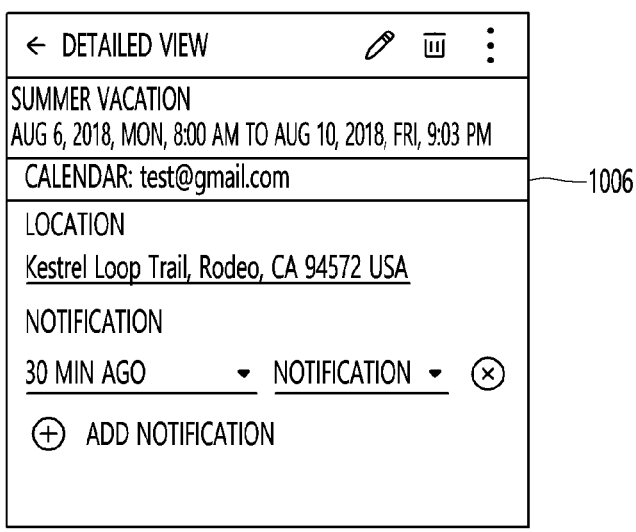
FIG. 10B is a view illustrating a search result interface according to an embodiment of the present disclosure.

FIGS. 10A and 10B are views illustrating a search result interface according to an embodiment of the present disclosure.

Referring to FIG. 10A, the processor 180 may sort and display the search result according to the application type. For example, the processor 180 may generate and display, via the display, the search result interface sorted by the application type of the user interest data included in the search result.

For example, the processor 180 may generate a search result interface including user interest data 1001 having a schedule management application type, user interest data 1002 having a phone application type, user interest data 1003 having a memo application type, user interest data 1004 having a text application type and user interest data 1005 having a photo application type.

In addition, the processor 180 may receive selection for the user interest data included in the search result interface and execute the application of the selected user interest data.

Referring to FIG. 10B, the processor 180 may receive user selection for the user interest data 1001 having the schedule management application type and execute the selected schedule management application 1006.

FIGS. 11 to 14 are views illustrating a search word input interface according to an embodiment of the present disclosure.

Figure 11:
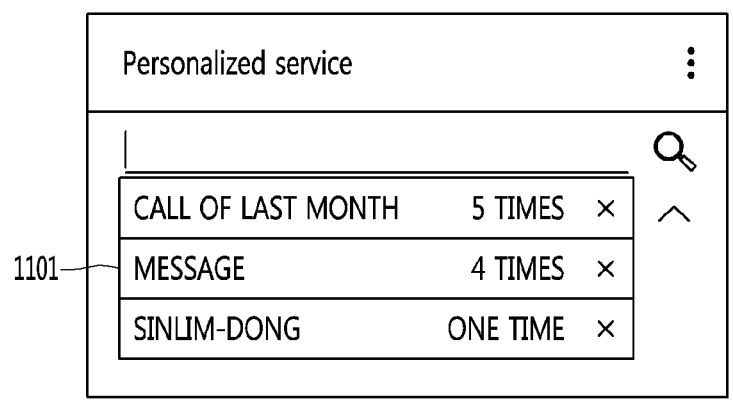
FIGS. 11 to 14 are views illustrating a search word input interface according to an embodiment of the present disclosure.

Referring to FIG. 11, when the processor 180 may display a previous search log 1101 via the display when user touch is input to the search word input interface. The previous search log 1101 may include an input search word and search count information. The processor 180 may sort the previous search log in the order of search count and display the previous search log via the display.

Figure 12:
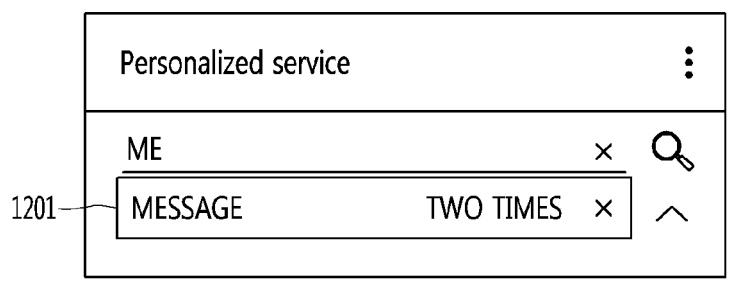

Referring to FIG. 12, the processor 180 may display, via the display, a previous search record 1201 matching the search word input to the search word input interface.

Figure 13:
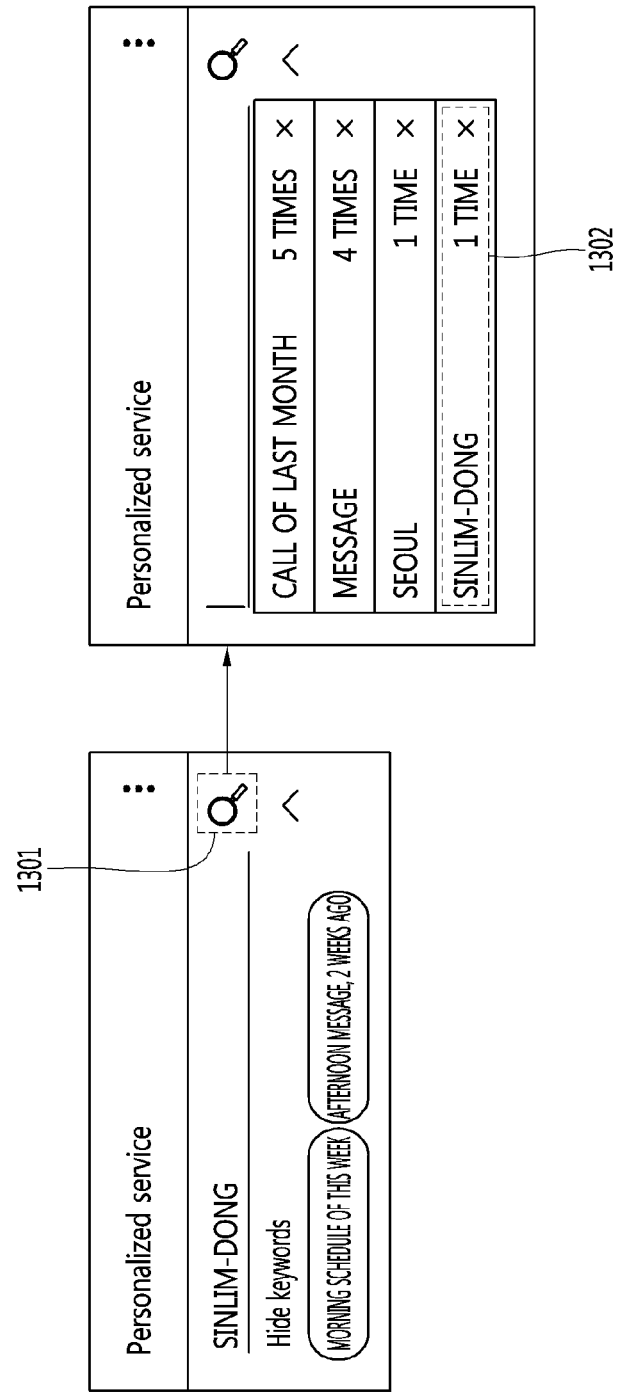

Referring to FIG. 13, the processor 180 may acquire a search execution command via a search button interface 1301 and perform search. The processor 180 may store the searched search word in the search log 1302.

Figure 14:
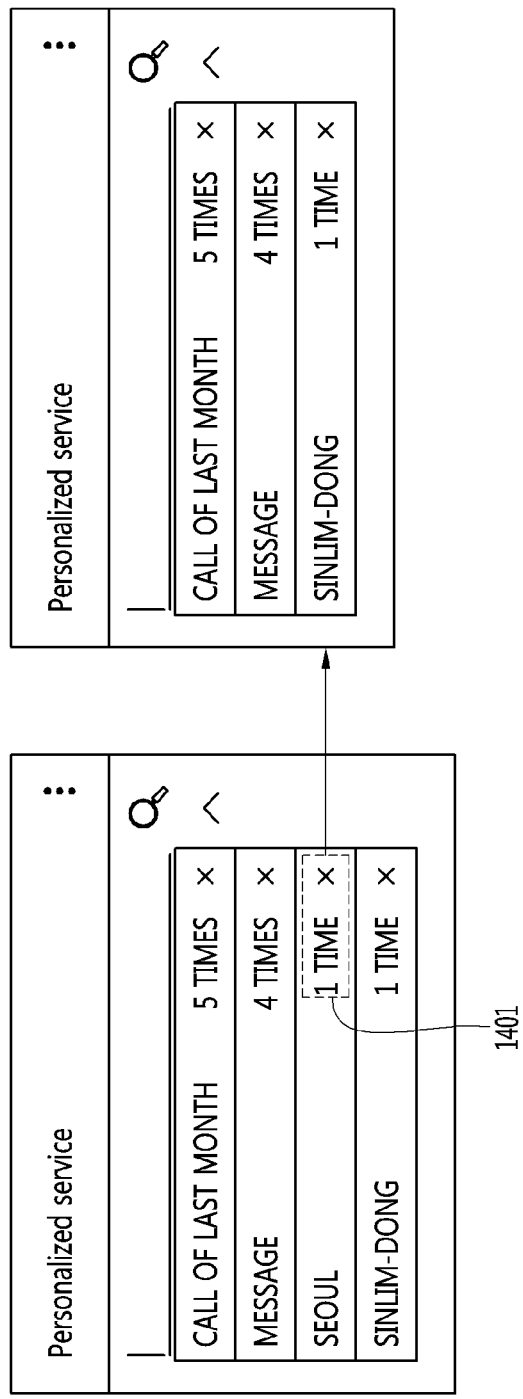

Referring to FIG. 14, the processor 180 may delete the search word from the previous search log, when a deletion command 1401 is received with respect to the previous search log.

Figure 15:
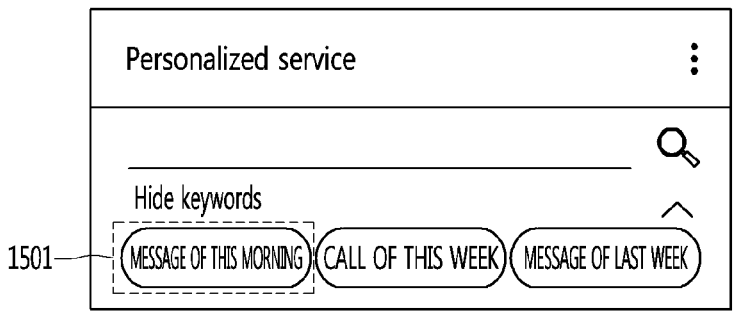
FIG. 15 is a view illustrating a method of displaying keyword combinations according to an embodiment of the present disclosure.

FIG. 15 is a view illustrating a method of displaying keyword combinations according to an embodiment of the present disclosure.

The processor 180 may generate keyword combinations including at least one of the time keyword, the place keyword, the object keyword or the application type keyword based on the user interest data.

Referring to FIG. 15, the processor 180 may generate keyword combinations "message of this morning", "call of this week" and "message of last week" from the user interest data and display, via the display, a keyword combination interface including the generated keyword combinations.

In this case, the processor 180 may first, from the left side, display "message of this morning" 1501 having highest priority among the generated keyword combinations.

Figure 16:
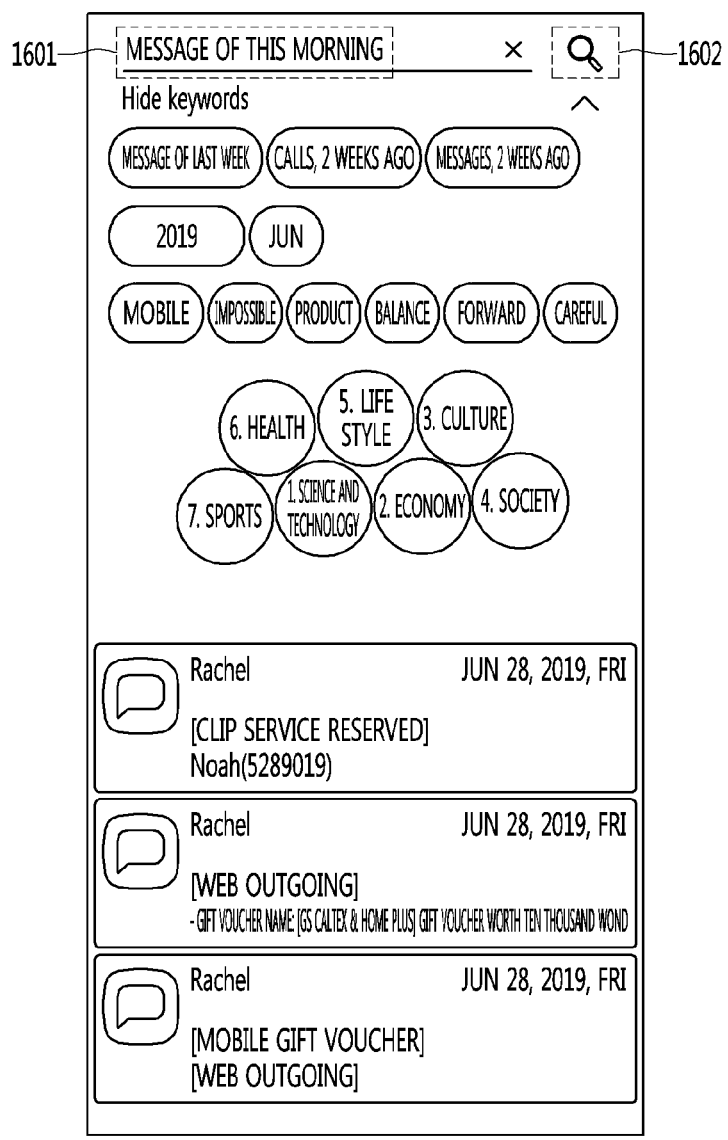
FIG. 16 is a view illustrating a search interface, in which a keyword combination is selected, according to an embodiment of the present disclosure.

FIG. 16 is a view illustrating a search interface, in which a keyword combination is selected, according to an embodiment of the present disclosure.

Referring to FIG. 16, the processor 180 may display the selected keyword combination in the search word input interface, when the keyword combination "message of this morning" is selected in the keyword combination interface.

The processor 180 may receive the search command of the user via a search button interface 1602, display a search result corresponding thereto, and recommend keywords assisting in search. In addition, the processor 180 may change the priority of the selected keyword combination to lowest priority.

Figure 17:
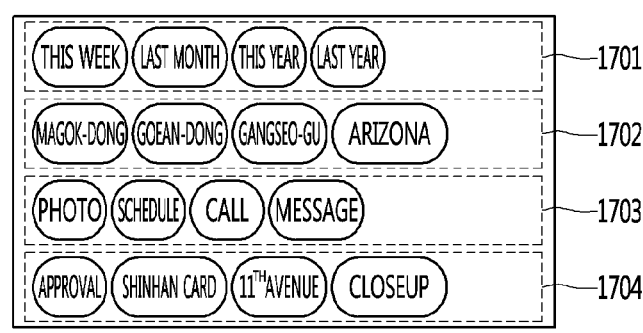
FIG. 17 is a view illustrating a hint keyword interface according to an embodiment of the present disclosure.

FIG. 17 is a view illustrating a hint keyword interface according to an embodiment of the present disclosure.

Referring to FIG. 17, the processor 180 may generate and display, via the display, a hint keyword interface including a time hint keyword 1701, a place hint keyword 1702, an application type hint keyword 1703 and an object hint keyword 1704 for detailed search corresponding to the search word.

The processor 180 may sort the time hint keywords 1701 in order of being close to a current time. For example, the processor 180 may sort the time keywords in order of today, yesterday, this week, last week, this month, last month, this year and last year. In addition, the processor 180 may allow a maximum of four time hint keywords to be included in hint keyword interface.

In addition, the processor 180 may sort the place hint keywords 1702 in order from a small region to a large region.

For example, the processor 180 may include, in the hint keyword interface, two place keywords in dong units, one place keyword in gu units, and one place keyword in si units. In addition, the processor 180 may sort the place hint keywords in order of street number, street name or city name.

In addition, the processor 180 may sort the application type hint keywords 1703 in order of the frequency of generation.

Meanwhile, the processor 180 may include four application type keywords having the highest frequency of generation among the application type hint keywords 1703 in the hint keyword interface.

In addition, the processor 180 may sort and include, in the hint keyword interface, four object keywords having the highest frequency of generation among the object hint keywords 1704 in order of the frequency of generation.

Figure 18:
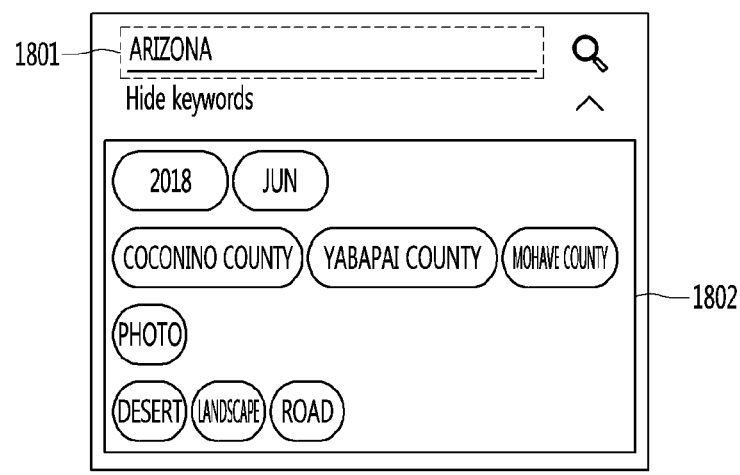
FIG. 18 is a view illustrating a method of displaying keywords provided according to an input search word according to an embodiment of the present disclosure.

FIG. 18 is a view illustrating a method of displaying keywords provided according to an input search word according to an embodiment of the present disclosure.

Referring to FIG. 18, the processor 180 may acquire a time hint keyword, a place hint keyword, an object hint keyword and an application type hint keyword for detailed search corresponding to a search word based on keyword combinations labeled in the user interest data included in the search result corresponding to the search word "Arizona".

For example, the processor 180 may acquire and include, in a hint keyword interface 1802, time hit keywords "2018" and "January" capable of searching for the search result of "Arizona" in more detailed time units.

In addition, the processor 180 may acquire and include, in the hit keyword interface 1802, place hint keywords "Coconino County", "Yabapai county" and "Mohave County" capable of searching for the search result of "Arizona" in more detailed place units.

In addition, the processor 180 may acquire and include, in the hint keyword interface 1802, the application type hint keyword "photo" capable of searching for the user interest data included in the search result of "Arizona" according to the application type.

In addition, the processor 180 may acquire and include, in the hint keyword interface 1802, object hint keyword "desert", "retail", "blue" and "landscape" capable of searching for the search result of "Arizona" in more detailed object units.

Figure 19A:
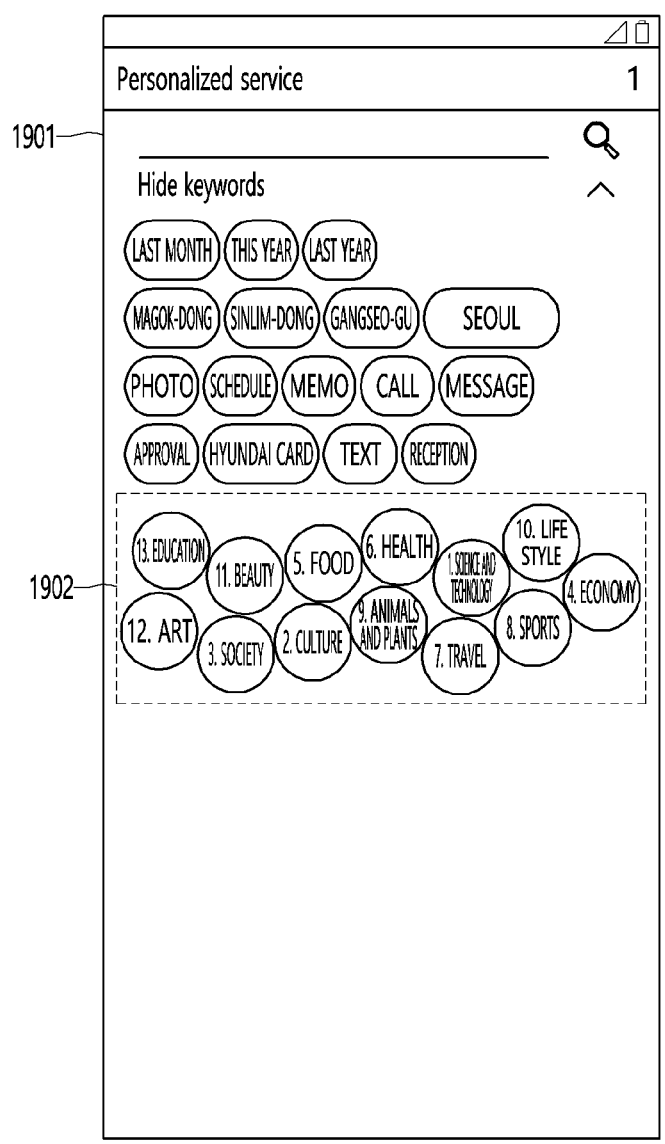
FIG. 19A is a view illustrating a search service provision method using an interest category according to an embodiment of the present disclosure.
Figure 19B:
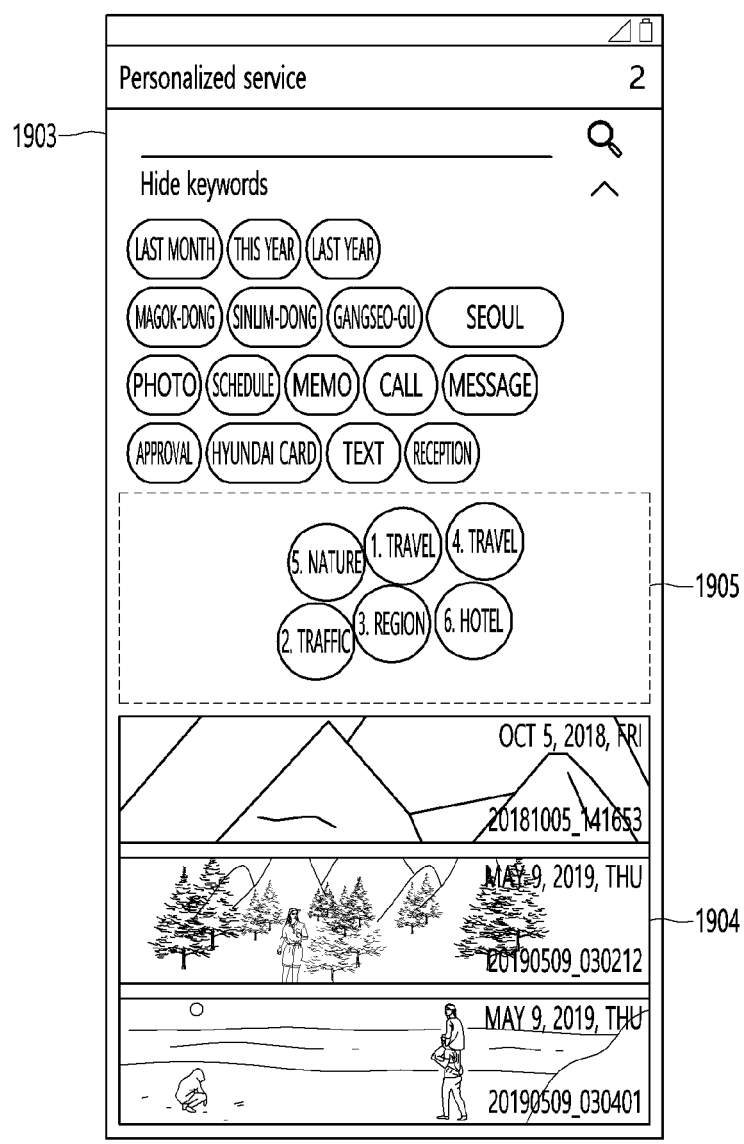
FIG. 19B is a view illustrating a search service provision method using an interest category according to an embodiment of the present disclosure.

FIGS. 19A and 19B are views illustrating a search service provision method using an interest category according to an embodiment of the present disclosure.

Referring to FIG. 19A, the processor 180 may display, via the display, an initial search interface 1901, to which a search word is not input.

The processor 180 may display an interest category interface 1902 including interest categories labeled in the user interest data.

The processor 180 may acquire a search request for an interest category via the input unit 120. For example, when the user selects an interest category "travel", the processor 180 may acquire a search request for the interest category "travel".

The processor 180 may acquire, as a search result, the user interest data labeled with the interest category, search of which is requested. For example, the processor 180 may acquire, as a search result, the user interest data labeled with the interest category "travel", search of which is requested.

Referring to FIG. 19B, the processor 180 may generate a search result interface 1904 including the search result. In addition, the processor 180 may generate and display, via the display, a search interface 1903 including an interest category interface 1905 including the subcategory of the interest category, search of which is requested.

For example, the processor 180 may generate the search result interface 1904 including image data having an interest category "travel" and generate an interest category interface 1903 including subcategories "travel", "traffic", "region", "nature" and "hotel" of the interest category "travel".

Referring to FIGS. 20A, 20B, 20C, and 20D, the processor 180 may display a search interface 2001, to which a search word is input, via the display.

The processor 180 may generate a search interface 2003 including a search result of the input search word "message of last year". The processor 180 may generate an interest category interface 2002 including the interest category labeled in the user interest data included in the search result.

The processor 180 may acquire a search request for the interest category via the input unit 120. For example, when the user selects the interest category "sports", the processor 180 may acquire the search request for the interest category "sports".

Figure 20A:
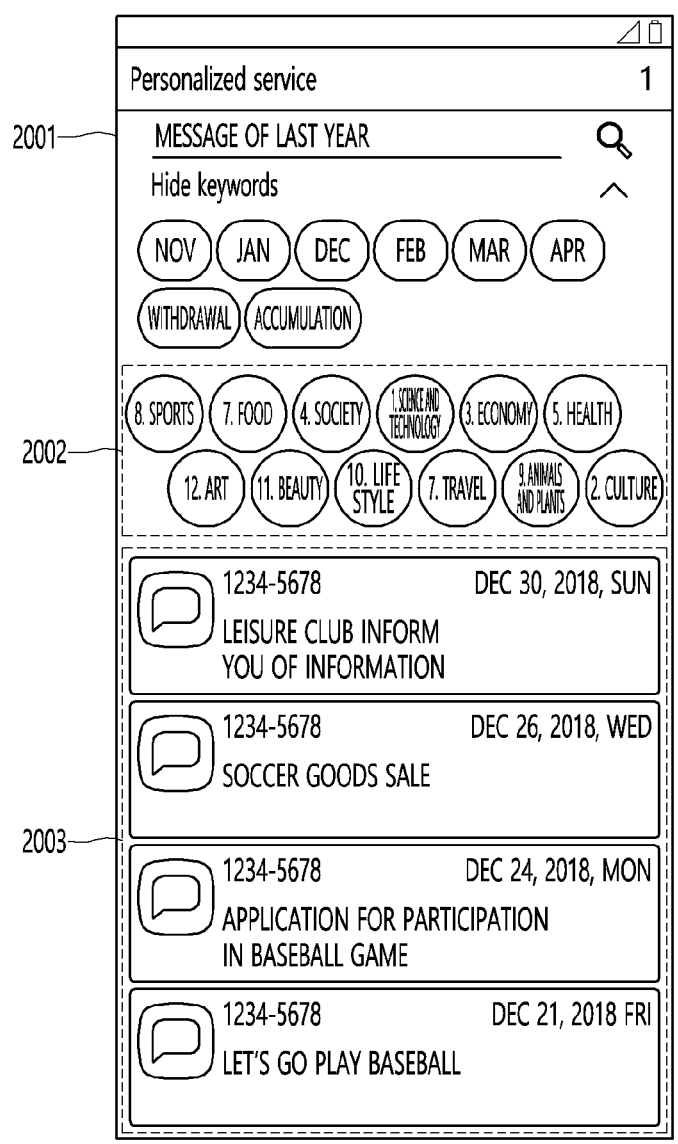
FIG. 20A is a view illustrating a search service provision method using an interest category according to an embodiment of the present disclosure.
Figure 20B:
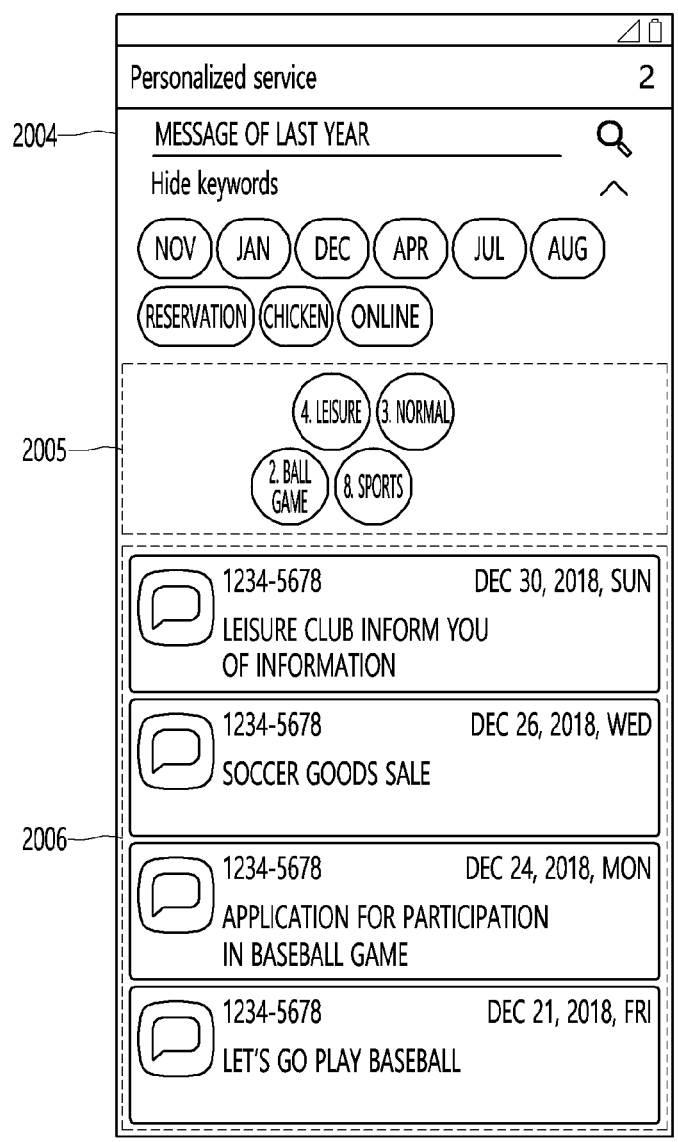
FIG. 20B is a view illustrating a search service provision method using an interest category according to an embodiment of the present disclosure.

Referring to FIG. 20B, the processor 180 may acquire, as a search result, data labeled with the interest category "sports", search of which is requested in the search result of "message of last year". The processor 180 may generate a search result interface 2006 including the search result. In addition, the processor 180 may generate and display, via the display, a search interface 2004 including the interest category interface 2005 including subcategories "ball game, normal and leisure" of the interest category "sports", search of which is requested.

In addition, the processor 180 may acquire the search request for the subcategory interest category via the input unit 120 again. For example, when the user selects the interest category "ball game", the processor 180 may acquire the search request for the interest category "ball game".

Figure 20C:
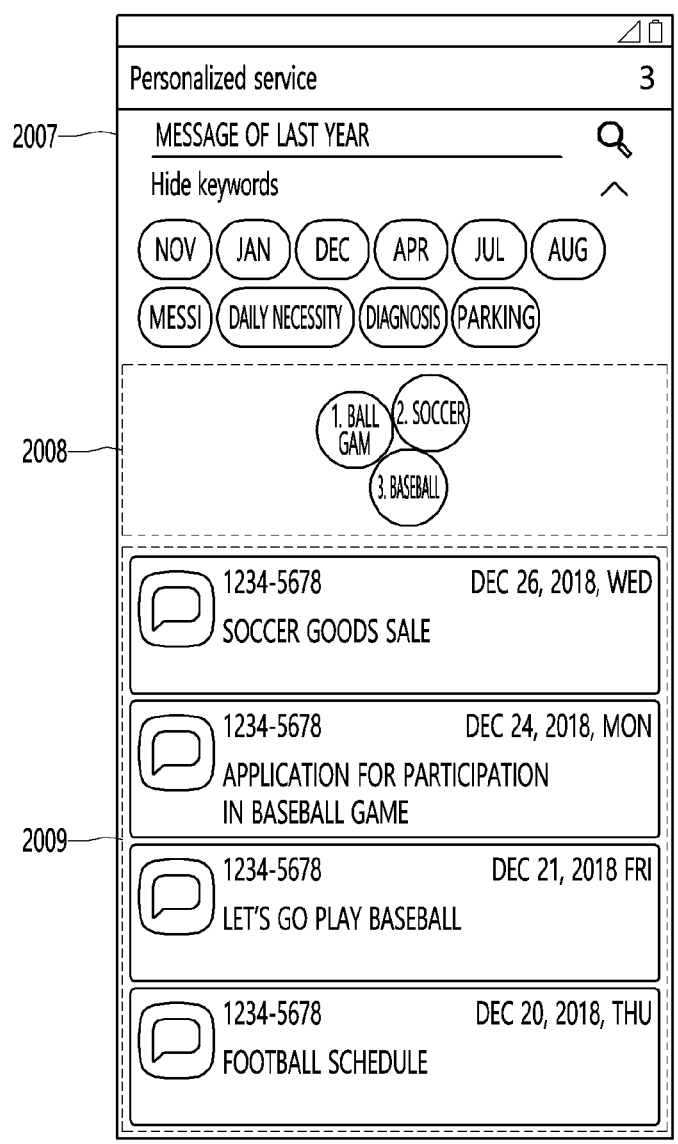
FIG. 20C is a view illustrating a search service provision method using an interest category according to an embodiment of the present disclosure.

Referring to FIG. 20C, the processor 180 may acquire, as a search result, data labeled with the interest category "ball game", search of which is requested. The processor 180 may generate a search result interface 2009 including the search result. In addition, the processor 180 may generate and display, via the display, a search interface 2007 including an interest category interface 2008 including the subcategory "soccer and baseball" of the interest category "ball game", search of which is requested.

In addition, the processor 180 may acquire the search request for the subcategory interest category again via the input unit 120. The processor 180 may perform search using the interest category until the interest category without a subcategory interest category appears. For example, when the user selects the interest category "baseball", the processor 180 may acquire the search request for the interest category "baseball".

Figure 20D:
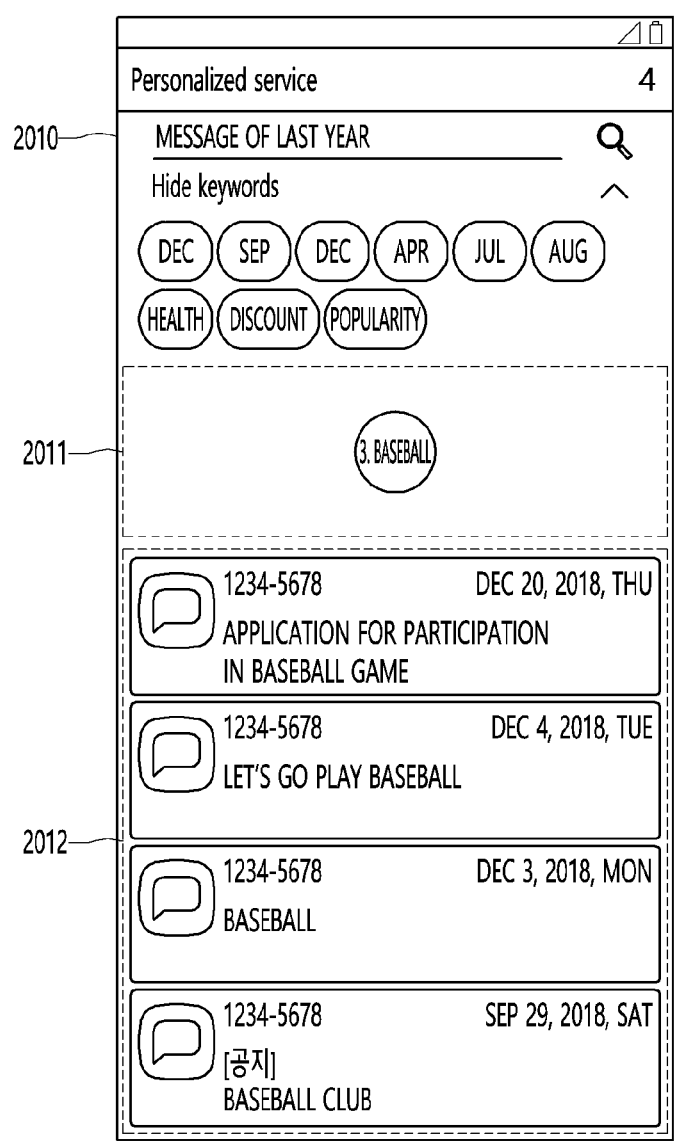
FIG. 20D is a view illustrating a search service provision method using an interest category according to an embodiment of the present disclosure.

Referring to FIG. 20D, the processor 180 may acquire, as a search result, data labeled with the interest category "baseball", search of which is requested. The processor 180 may generate a search result interface 2012 including the search result.

Meanwhile, since the subcategory of the interest category "baseball", search of which is requested, is not present, the processor 180 may generate and display, via the display, a search interface 2010 including an interest category interface 2011 including only the interest category "baseball".

According to the embodiment of the present disclosure, it is possible to provide a service capable of easily searching for information desired by a user on one screen.

According to various embodiments of the present disclosure, it is possible to provide a search service capable of recommending keyword combinations of data of interest to a user.

According to various embodiments of the present disclosure, it is possible to provide a convenient search service by predicting a search keyword of a user and generating and recommending keyword combinations.

According to various embodiments of the present disclosure, it is possible to provide a service capable of easily performing search by recommending keywords according to a time, a place, an object and an application type.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the server.

What is claimed is:

1. An artificial intelligence device comprising:
   a memory configured to store user interest data;
   a processor configured to generate a keyword combination including at least one of a time keyword, a place keyword, an object keyword or an application type keyword based on the user interest data; and
   a display configured to display at least one of a time keyword, a place keyword, an object keyword or an application type keyword included in the keyword combination,
   wherein the processor is configured to:
   acquire a search word for searching for the user interest data,
   extract at least one of a time search word, a place search word, an object search word or an application type search word from the search word,
   acquire, as a search result, user interest data labeled with a keyword combination common with at least one of the time search word, the place search word, the object search word or the application type search word, and
   wherein the display is configured to display the search result.

2. The artificial intelligence device of claim 1, wherein the processor is configured to:
   determine whether an event of interest to a user has occurred based on location information of the artificial intelligence device,
   acquire, as a place keyword, a location where the event has occurred, and
   acquire at least one of a time keyword, an object keyword or an application type keyword based on user interest data generated repeatedly by more than a predetermined reference value for a predetermined time at the location where the event has occurred to generate the keyword combination.

3. The artificial intelligence device of claim 1, wherein the processor is configured to:
   classify the user interest data by interest category,
   acquire a field of interest to a user based on the classified interest category,
   acquire, from, the user interest data, an object keyword matching the field of interest,
   give a weight to the object keyword, and
   acquire at least one of a time keyword, a place keyword or an application type keyword based on user interest data, from which the object keyword is extracted, to generate the keyword combination when the weight of the object keyword is equal to or greater than a predetermined reference value.

4. The artificial intelligence device of claim 3, wherein the processor is configured to:
- label the user interest data with the classified interest category,
- acquire a search request for the interest category, and
- acquire, as a search result, user interest data labeled with the interest category.

5. The artificial intelligence device of claim 1, wherein the processor is configured to:
- separate and extract a noun from text data included in the user interest data to generate the extracted noun as the object keyword.

6. The artificial intelligence device of claim 1, wherein the processor is configured to generate the object keyword based on an object recognized from image data included in the user interest data or tag information of the image data.

7. The artificial intelligence device of claim 1, wherein the processor is configured to determine priority of the keyword combination according to frequency of generating the keyword combination.

8. The artificial intelligence device of claim 1, wherein the processor is configured to acquire a time hint keyword, a place hint keyword, an object hint keyword or an application type hint keyword for detailed search corresponding to the search word based on a keyword combination labeled with user interest data included in the search result.

9. The artificial intelligence device of claim 8, wherein the display displays at least one of the time hint keyword, the place hint keyword, the object hint keyword or the application type hint keyword.

10. A method of providing a search service at an artificial intelligence device, the method comprising:
- storing user interest data;
- generating a keyword combination including at least one of a time keyword, a place keyword, an object keyword or an application type keyword based on the user interest data;
- displaying at least one of a time keyword, a place keyword, an object keyword or an application type keyword included in the keyword combination;
- acquiring a search word for searching for the user interest data;
- extracting at least one of a time search word, a place search word, an object search word or an application type search word from the search word;
- acquiring, as a search result, user interest data labeled with a keyword combination common with at least one of the time search word, the place search word, the object search word or the application type search word; and
- displaying the search result.

11. The method of claim 10, wherein the generating of the keyword combination includes:
- determining whether an event of interest to a user has occurred based on location information of the artificial intelligence device,
- acquiring, as a place keyword, a location where the event has occurred,
- acquiring at least one of a time keyword, an object keyword or an application type keyword based on user interest data generated repeatedly by more than a predetermined reference value at the location where the event has occurred to generate the keyword combination.

12. The method of claim 10, wherein the generating of the keyword combination includes:
- classifying the user interest data by interest category,
- acquiring a field of interest to a user based on the classified interest category,
- acquiring an object keyword matching the field of interest from the user interest data,
- giving a weight to the object keyword,
- acquiring at least one of a time keyword, a place keyword or an application type keyword based on user interest data, from which the object keyword is extracted, to generate the keyword combination, when the weight of the object keyword is equal to or greater than a predetermined reference value.

13. The method of claim 12, further comprising:
- labeling the user interest data with the classified interest category,
- acquiring a search request for the interest category, and
- acquiring, as a search result, user interest data labeled with the interest category.

14. The method of claim 12, wherein the acquiring of the object keyword matching the field of interest from the user interest data includes separating and extracting a noun from text data included in the user interest data to generate the extracted noun as the object keyword.

15. The method of claim 12, wherein the acquiring of the object keyword matching the field of interest from the user interest data includes generating the object keyword based on an object recognized from image data included in the user interest data or tag information of the image data.

16. The method of claim 10, further comprising determining priority of the keyword combination according to frequency of generating the keyword combination.

17. The method of claim 10, further comprising acquiring a time hint keyword, a place hint keyword, an object hint keyword or an application type hint keyword for detailed search corresponding to the search word based on a keyword combination labeled with user interest data included in the search result.

18. The method of claim 17, further comprising displaying at least one of the time hint keyword, the place hint keyword, the object hint keyword or the application type hint keyword.

* * * * *